United States Patent
Voelkel et al.

(10) Patent No.: US 9,951,288 B2
(45) Date of Patent: Apr. 24, 2018

(54) USE OF AN ALKOXYLATED POLYTETRAHYDROFURAN TO REDUCE FUEL CONSUMPTION

(71) Applicant: BASF SE, Ludwigshafen (DE)

(72) Inventors: Ludwig Voelkel, Limburgerhof (DE); Markus Hansch, Speyer (DE); Thomas Hayden, Wappingers Falls, NY (US); Marc Walter, Frankenthal (DE); Nawid Kashani-Shirazi, Mannheim (DE); Thomas Weiss, Ilvesheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/031,466

(22) PCT Filed: Oct. 14, 2014

(86) PCT No.: PCT/EP2014/071932
§ 371 (c)(1),
(2) Date: Apr. 22, 2016

(87) PCT Pub. No.: WO2015/058992
PCT Pub. Date: Apr. 30, 2015

(65) Prior Publication Data
US 2016/0264899 A1 Sep. 15, 2016

Related U.S. Application Data

(63) Continuation of application No. 14/062,130, filed on Oct. 24, 2013, now abandoned.

(51) Int. Cl.
| | |
|---|---|
| *C10L 10/08* | (2006.01) |
| *C10L 1/185* | (2006.01) |
| *C10M 177/00* | (2006.01) |
| *C08G 65/20* | (2006.01) |
| *C10L 1/198* | (2006.01) |
| *C10L 10/18* | (2006.01) |
| *C10L 10/04* | (2006.01) |
| *C08G 65/26* | (2006.01) |
| *C08G 65/331* | (2006.01) |
| *C08L 71/02* | (2006.01) |
| *C10L 1/18* | (2006.01) |
| *C10L 1/22* | (2006.01) |

(Continued)

(52) U.S. Cl.
CPC .............. *C10L 10/08* (2013.01); *C08G 65/20* (2013.01); *C08G 65/2609* (2013.01); *C08G 65/331* (2013.01); *C08L 71/02* (2013.01); *C10L 1/18* (2013.01); *C10L 1/1852* (2013.01); *C10L 1/1985* (2013.01); *C10L 1/22* (2013.01); *C10L 10/04* (2013.01); *C10L 10/18* (2013.01); *C10M 177/00* (2013.01); *C08G 2650/24* (2013.01); *C10L 1/1608* (2013.01); *C10L 1/2222* (2013.01); *C10L 1/2383* (2013.01); *C10L 2200/0259* (2013.01); *C10L 2230/22* (2013.01); *C10L 2270/023* (2013.01); *C10M 2209/103* (2013.01); *C10N 2230/06* (2013.01); *C10N 2240/104* (2013.01)

(58) Field of Classification Search
CPC .... C10L 1/1852; C10L 1/1985; C10L 1/2383; C10L 2230/22
See application file for complete search history.

(56) References Cited

U.S. PATENT DOCUMENTS

| | | | | | |
|---|---|---|---|---|---|
| 4,198,464 | A | * | 4/1980 | Login | .................... D06M 7/00 |
| | | | | | 252/8.84 |
| 4,245,004 | A | * | 1/1981 | Login | ................. D06M 13/165 |
| | | | | | 252/8.84 |

(Continued)

FOREIGN PATENT DOCUMENTS

| | | |
|---|---|---|
| CN | 1161684 A | 10/1997 |
| CN | 1720317 A | 1/2006 |

(Continued)

OTHER PUBLICATIONS

Written Opinion dated Feb. 11, 2015 in PCT/EP2014/071932 filed Oct. 14, 2014 (submitting English translation only).
International Search Report dated Feb. 11, 2015 in PCT/EP2014/071932 filed Oct. 14, 2014.
International Preliminary Report on Patentability dated Apr. 26, 2016 in PCT/EP2014/071932 filed Oct. 14, 2014.
International Search Report dated Jul. 2, 2015 in PCT/EP2014/072384.
Office Action dated Apr. 1, 2017 in Chinese Patent Application No. 2014800660211 (submitting English language translation only).

(Continued)

*Primary Examiner* — Cephia D Toomer
(74) *Attorney, Agent, or Firm* — Oblon, McClelland, Maier & Neustadt, L.L.P.

(57) ABSTRACT

The use of an alkoxylated polytetrahydrofurane of formula wherein m, m', n, n', p, p' and k are integers in the range of ≥1, $R^1$ denotes an unsubstituted linear or branched alkyl radical, $R^2$ denotes —$CH_2$—$CH_3$, and $R^3$ denotes a hydrogen atom or —$CH_3$, as an additive in a fuel for reducing fuel consumption in the operation of an internal combustion engine with this fuel.

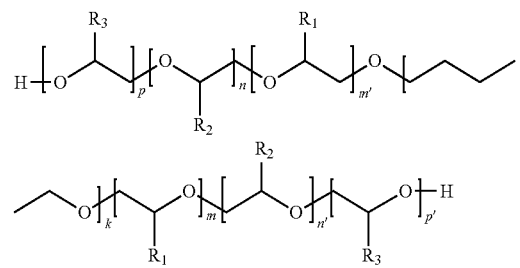

20 Claims, No Drawings

(51) Int. Cl.
  *C10L 1/16* (2006.01)
  *C10L 1/2383* (2006.01)
  *C10L 1/222* (2006.01)

(56) References Cited

U.S. PATENT DOCUMENTS

| | | | |
|---|---|---|---|
| 4,849,572 | A | 7/1989 | Chen et al. |
| 4,877,416 | A | 10/1989 | Campbell et al. |
| 6,133,211 | A | 10/2000 | Cobianco et al. |
| 6,339,163 | B1 | 1/2002 | Delfort et al. |
| 6,423,107 | B1 * | 7/2002 | Delfort .................. C08G 65/20 44/443 |
| 6,462,001 | B1 | 10/2002 | Kenbeek et al. |
| 8,449,630 | B2 * | 5/2013 | Lange ........................ C08F 8/32 44/412 |

FOREIGN PATENT DOCUMENTS

| | | |
|---|---|---|
| DE | 32 10 283 A1 | 9/1983 |
| DE | 38 26 608 A1 | 2/1990 |
| DE | 38 38 918 A1 | 5/1990 |
| DE | 41 42 241 A1 | 6/1993 |
| DE | 43 09 074 A1 | 9/1994 |
| DE | 196 20 262 A1 | 11/1997 |
| DE | 101 02 913 A1 | 7/2002 |
| EP | 0 090 444 A2 | 10/1983 |
| EP | 0 244 616 A2 | 11/1987 |
| EP | 0 307 815 A1 | 3/1989 |
| EP | 0 310 875 A1 | 4/1989 |
| EP | 0 356 725 A1 | 3/1990 |
| EP | 0 452 328 A1 | 10/1991 |
| EP | 0 476 485 A1 | 3/1992 |
| EP | 0 548 617 A2 | 6/1993 |
| EP | 0 608 149 A1 | 7/1994 |
| EP | 0 639 632 A1 | 2/1995 |
| EP | 0 700 985 A1 | 3/1996 |
| EP | 0 831 141 A1 | 3/1998 |
| EP | 1 076 062 A1 | 2/2001 |
| EP | 1 076 072 A1 | 2/2001 |
| EP | 0 862 947 B1 | 4/2003 |
| EP | 1 424 322 A1 | 6/2004 |
| WO | WO 87/01126 A1 | 2/1987 |
| WO | WO 91/03529 A1 | 3/1991 |
| WO | WO 94/24231 A1 | 10/1994 |
| WO | WO 96/03367 A1 | 2/1996 |
| WO | WO 96/03479 A1 | 2/1996 |
| WO | WO 97/03946 A1 | 2/1997 |
| WO | WO 99/16849 A1 | 4/1999 |
| WO | WO 00/47698 A1 | 8/2000 |
| WO | WO 03/070860 A1 | 8/2003 |
| WO | WO 2004/026997 A2 | 4/2004 |
| WO | WO 2004/090079 A1 | 10/2004 |
| WO | WO 2007/053787 A1 | 5/2007 |

OTHER PUBLICATIONS

European Search Report dated Aug. 4, 2017, in European Patent Application No. 17173711.7.
U.S. Appl. No. 15/031,474, filed Apr. 22, 2016, Ludwig Voelkel, et al.
U.S. Appl. No. 14/774,040, filed Sep. 9, 2015, US 2016/0024412 A1, Nawid Kashani-Shirazi, et al.
U.S. Appl. No. 14/890,746, filed Nov. 12, 2015, US 2016/0090546 A1, Nawid Kashani-Shirazi, et al.

* cited by examiner

USE OF AN ALKOXYLATED POLYTETRAHYDROFURAN TO REDUCE FUEL CONSUMPTION

The present invention relates to the use of an alkoxylated polytetrahydrofurane of general formula (I)

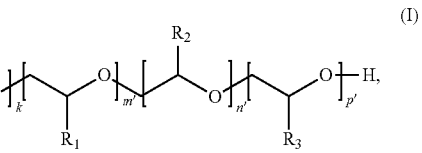

wherein
m is an integer in the range of $\geq 1$ to $\leq 50$,
m' is an integer in the range of $\geq 1$ to $\leq 50$,
(m+m') is an integer in the range of $\geq 1$ to $\leq 90$,
n is an integer in the range of $\geq 0$ to $\leq 75$,
n' is an integer in the range of $\geq 0$ to $\leq 75$,
p is an integer in the range of $\geq 0$ to $\leq 75$,
p' is an integer in the range of $\geq 0$ to $\leq 75$,
k is an integer in the range of $\geq 2$ to $\leq 30$,
$R^1$ denotes an unsubstituted, linear or branched, alkyl radical having 6, 7, 8, 9, 10, 11, 12, 13, 14, 15, 16, 17, 18, 19, 20, 21, 22, 23, 24, 25, 26, 27 or 28 carbon atoms,
$R^2$ denotes —$CH_2$—$CH_3$, and
$R^3$ identical or different, denotes a hydrogen atom or —$CH_3$,
whereby the concatenations denoted by k are distributed to form a block polymeric structure and the concatenations denoted by p, p', n, n', m and m' are distributed to form a block polymeric structure or a random polymeric structure, as an additive in a fuel for different purposes.

The present invention further relates to a fuel composition which comprises a gasoline fuel, the alkoxylated polytetrahydrofurane mentioned and at least one fuel additive with detergent action.

The present invention further relates to an additive concentrate which comprises the alkoxylated polytetrahydrofurane mentioned and at least one fuel additive with detergent action.

It is known that particular substances in the fuel reduce internal friction in the internal combustion engines, especially in gasoline engines, and thus help to save fuel. Such substances are also referred to as lubricity improvers, friction reducers or friction modifiers. Lubricity improvers customary on the market for gasoline fuels are usually condensation products of naturally occurring carboxylic acids such as fatty acids with polyols such as glycerol or with alkanolamines, for example glyceryl monooleate.

A disadvantage of the prior art lubricity improvers mentioned is poor miscibility with other typically used fuel additives, especially with detergent additives such as polyisobuteneamines and/or carrier oils such as polyalkylene oxides. An important requirement in practice is that the component mixtures or additive concentrates provided are readily pumpable even at relatively low temperatures, especially at outside winter temperatures of, for example, down to −20° C., and remain homogeneously stable over a prolonged period, i.e. no phase separation and/or precipitates may occur.

Typically, the miscibility problems outlined are avoided by adding relatively large amounts of mixtures of paraffinic or aromatic hydrocarbons with alcohols such as tert-butanol or 2-ethylhexanol as solubilizers to the component mixtures or additive concentrates. In some cases, however, considerable amounts of these expensive solubilizers are necessary in order to achieve the desired homogeneity, and so this solution to the problem becomes uneconomic.

The low molecular weight carboxylic acids and carboxylic acid derivatives, glycol ethers and alkylated phenols recommended in WO 2007/053787 as solubilizers for such component mixtures or additive concentrates are also uneconomic owing to their high feedstock costs and, apart from their function as solubilizers, do not have any further positive effects. On the contrary, they harbor the risk of causing adverse effects, for example undesired oil dilution and increased formation of combustion chamber deposits.

In addition, the prior art lubricity improvers mentioned often have the tendency to form emulsions with water in the component mixtures or additive concentrates or in the fuel itself, such that water which has penetrated can be removed again via a phase separation only with difficulty or at least only very slowly.

For instance, the lubricity improvers described in EP-A 1 424 322 and WO 03/070860, which are based on polyisobutenylsuccinimides with mono- or polyamines or alkanol-amines such as butylamine, diethylenetriamine, tetraethylenepentamine or amino-ethyleneethanolamine, exhibit good miscibility with further additive components in corresponding mixtures or concentrates, but have a marked tendency to form stable emulsions with water, which can lead to the effect that water and soil particles are entrained into the fuel supply chain and ultimately can also get into the engine. Water can cause corrosion; soil particles can lead to damage in fuel pumps, fuel filters and injectors.

EP-A 1 076 072 describes certain derivatives of polytetrahydrofurans as fuel detergents, i.e. for improving intake valve cleanliness of internal combustion engines. Such derivatives of polytetrahydrofurans can be applied together with other additives with detergent action, however, EP-A 1 076 072 is silent about specifying said other additives with detergent action. Furthermore, EP-A 1 076 072 does not teach to apply such derivatives of polytetrahydrofurans as fuel additives for reducing fuel consumption.

Furthermore, EP-A 1 076 072 does not teach to apply such derivatives of polytetrahydrofurans as fuel additives for reducing fuel consumption.

It was an object of the present invention to provide fuel additives which firstly bring about effective fuel saving in the operation of a spark-ignited internal combustion engine, and secondly no longer have the outlined shortcomings of the prior art, i.e. more particularly not remaining homogeneously stable over a prolonged period without any phase separation and/or precipitates, poor miscibility with other fuel additives and the tendency to form emulsions with water. In addition, they should not worsen the high level of intake valve cleanliness achieved by the modern fuel additives.

Accordingly, the use of an alkoxylated polytetrahydrofurane of general formula (I) as described above as an additive in a fuel for reducing fuel consumption in the operation of an internal combustion engine with this fuel has been found. Preferably, the said use as an additive in a gasoline fuel for reducing fuel consumption in the operation of a spark-ignited internal combustion engine with this fuel or as an additive in a gasoline fuel for reduction of fuel consumption in the operation of a self-ignition internal combustion engine with this fuel has been found.

It can be assumed that the cause of the fuel saving by virtue of the alkoxylated polytetrahydrofurane (I) mentioned is based substantially on the effect thereof as an additive which reduces internal friction in the internal combustion engines, especially in gasoline engines. The reaction product mentioned thus functions in the context of the present invention essentially as a lubricity improver.

Furthermore, the use of an alkoxylated polytetrahydrofurane of formula (I) as described above as an additive in a fuel for minimization of power loss in internal combustion engines and for improving acceleration of internal combustion engines has been found.

Furthermore, the use of an alkoxylated polytetrahydrofurane of formula (I) as described above as an additive in a fuel for improving the lubricity of lubricant oils contained in an internal combustion engine for lubricating purposes by operating the internal combustion engine with a fuel containing an effective amount of at least one alkoxylated polytetrahydrofurane of formula (I) has been found.

It can be assumed that a part of the alkoxylated polytetrahydrofurane (I) mentioned contained in the fuel is transported via the combustion chamber where the additive containing fuel is burnt into the lubricant oils and acting there as a further lubricating agent. The advantage of this mechanism is that the said further lubricating agent is continuously refreshed by the fuel feeding.

Spark-ignition internal combustion engines are preferably understood to mean gasoline engines, which are typically ignited with spark plugs. In addition to the customary four- and two-stroke gasoline engines, spark-ignition internal combustion engines also include other engine types, for example the Wankel engine. These are generally engines which are operated with conventional gasoline types, especially gasoline types according to EN 228, gasoline-alcohol mixtures such as Flex fuel with 75 to 85% by volume of ethanol, liquid pressure gas ("LPG") or compressed natural gas ("CNG") as fuel.

However, the inventive use of the alkoxylated polytetrahydofuran mentioned also relates to newly developed internal combustion engines such as the "HCCI" engine, which is self-igniting and is operated with gasoline fuel.

The instant invention works preferably with direct injection gasoline driven combustion engines.

Hence, in one embodiment, the presently claimed invention is directed to the use of an alkoxylated polytetrahydrofurane of general formula (II)

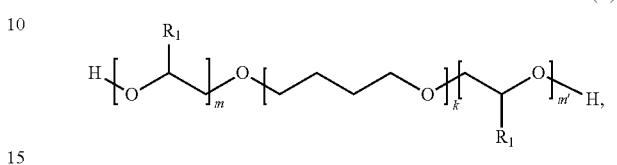

wherein m is an integer in the range of $\geq 0$ to $\leq 30$, m' is an integer in the range of $\geq 0$ to $\leq 30$, (m+m') is an integer in the range of $\geq 1$ to $\leq 60$, k is an integer in the range of $\geq 2$ to $\leq 30$, and $R^1$ denotes an unsubstituted, linear or branched, alkyl radical having 6, 7, 8, 9, 10, 11, 12, 13, 14, 15, 16, 17, 18, 19, 20, 21, 22, 23, 24, 25, 26, 27 or 28 carbon atoms, whereby the concatenations denoted by k, m and m' are distributed to form a block polymeric structure.

Hence, in another embodiment, the presently claimed invention is directed to the use of an alkoxylated polytetrahydrofurane of general formula (I)

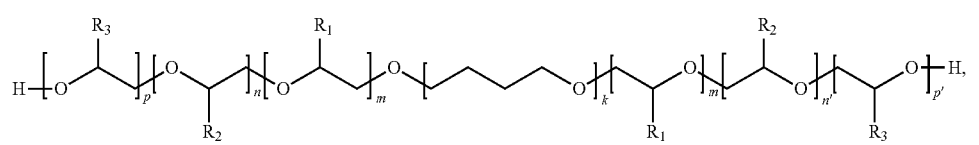

wherein m is an integer in the range of $\geq 1$ to $\leq 30$, m' is an integer in the range of $\geq 1$ to $\leq 30$, (m+m') is an integer in the range of $\geq 3$ to $\leq 50$, n is an integer in the range of $\geq 3$ to $\leq 45$, n' is an integer in the range of $\geq 3$ to $\leq 45$, (n+n') is an integer in the range of $\geq 6$ to $\leq 90$, p is an integer in the range of $\geq 0$ to $\leq 75$, p' is an integer in the range of $\geq 0$ to $\leq 75$, k is an integer in the range of $\geq 3$ to $\leq 25$, $R^1$ denotes an unsubstituted, linear or branched, alkyl radical having 6, 7, 8, 9, 10, 11, 12, 13, 14, 15, 16, 17 or 18 carbon atoms, $R^2$ denotes —$CH_2$—$CH_3$, and $R^3$ identical or different, denotes a hydrogen atom or —$CH_3$, whereby the concatenations denoted by k are distributed to form a block polymeric structure and the concatenations denoted by p, p', n, n', m and m' are distributed to form a block polymeric structure or a random polymeric structure.

Hence, in another embodiment, the presently claimed invention is directed to the use of an alkoxylated polytetrahydrofurane of general formula (I)

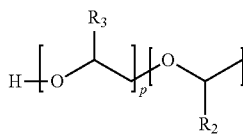 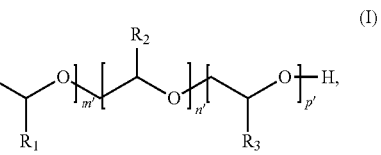 (I)

wherein
m is an integer in the range of ≥1 to ≤30,
m' is an integer in the range of ≥1 to ≤30,
(m+m') is an integer in the range of ≥3 to ≤50,
n is an integer in the range of ≥0 to ≤45,
n' is an integer in the range of ≥0 to ≤45,
p is an integer in the range of ≥3 to ≤45,
p' is an integer in the range of ≥3 to 45,
(p+p') is an integer in the range of ≥6 to ≤90,
k is an integer in the range of ≥3 to 25,
$R^1$ denotes an unsubstituted, linear or branched, alkyl radical having 6, 7, 8, 9, 10, 11, 12, 13, 14, 15, 16, 17 or 18 carbon atoms,
$R^2$ denotes —$CH_2$—$CH_3$, and
$R^3$ identical or different, denotes a hydrogen atom or —$CH_3$, whereby the concatenations denoted by k are distributed to form a block polymeric structure and the concatenations denoted by p, p', n, n', m and m' are distributed to form a block polymeric structure or a random polymeric structure.

As used herein, "branched" denotes a chain of atoms with one or more side chains attached to it. Branching occurs by the replacement of a substituent, e.g., a hydrogen atom, with a covalently bonded alkyl radical.

"Alkyl radical" denotes a moiety constituted solely of atoms of carbon and of hydrogen.

The inventively claimed alkoxylated polytetrahydrofuranes are oil soluble, which means that, when mixed with mineral oils and/or fuels in a weight ratio of 10:90, 50:50 and 90:10, the inventively claimed alkoxylated polytetrahydrofuranes do not show phase separation after standing for 24 hours at room temperature for at least two weight rations out of the three weight ratios 10:90, 50:50 and 90:10.

Preferably the alkoxylated polytetrahydrofurane has a kinematic viscosity in the range of ≥200 $mm^2$/s to ≤700 $mm^2$/s, more preferably in the range of ≥250 $mm^2$/s to ≤650 $mm^2$/s, at 40° C., determined according to ASTM D 445.

Preferably the alkoxylated polytetrahydrofurane has a kinematic viscosity in the range of ≥25 $mm^2$/s to ≤90 $mm^2$/s, more preferably in the range of ≥30 $mm^2$/s to ≤80 $mm^2$/s, at 100° C., determined according to ASTM D 445.

Preferably the alkoxylated polytetrahydrofurane has a pour point in the range of ≥−60° C. to ≤20° C., more preferably in the range of ≥−50° C. to ≤15° C., determined according to DIN ISO 3016.

Preferably the alkoxylated polytetrahydrofurane has a weight average molecular weight Mw in the range of 500 to 20000 g/mol, more preferably in the range of 2000 to 10000 g/mol, most preferably in the range of 2000 to 7000 g/mol, even more preferably in the range of 4000 to 7000 g/mol determined, determined according to DIN 55672-1.

Preferably the alkoxylated polytetrahydrofurane has a polydispersity in the range of 1.05 to 1.60, more preferably in the range of 1.05 to 1.50, most preferably in the range of 1.05 to 1.45, determined according to DIN 55672-1.

Preferably k is an integer in the range of ≥3 to ≤25, more preferably k is an integer in the range of ≥3 to ≤20, most preferably in the range of ≥5 to ≤20, even more preferably in the range of ≥6 to ≤16.

Preferably m is an integer in the range of ≥1 to ≤25 and m' is an integer in the range of ≥1 to ≤25, more preferably m is an integer in the range of ≥1 to ≤20 and m' is an integer in the range of ≥1 to ≤20.

Preferably (m+m') is an integer in the range of ≥3 to ≤65, more preferably (m+m') is an integer in the range of ≥3 to ≤50, even more preferably (m+m') is an integer in the range of ≥3 to ≤40.

Preferably the ratio of (m+m') to k is in the range of 0.3:1 to 6:1, more preferably in the range of 0.3:1 to 5:1, most preferably in the range of 0.3:1 to 4:1, even more preferably in the range of 0.3:1 to 3:1.

Preferably n is an integer in the range of ≥6 to ≤40 and n' is an integer in the range of ≥6 to ≤40, more preferably n is an integer in the range of ≥8 to ≤35 and p' is an integer in the range of ≥8 to ≤35.

Preferably (n+n') is an integer in the range of ≥10 to ≤80, more preferably (n+n') is an integer in the range of ≥15 to ≤70.

Preferably p is an integer in the range of ≥5 to ≤25 and p' is an integer in the range of ≥5 to ≤25, more preferably p is an integer in the range of ≥5 to ≤15 and p' is an integer in the range of ≥5 to 15.

Preferably (p+p') is an integer in the range of ≥10 to ≤30, more preferably (p+p') is an integer in the range of ≥15 to ≤30.

Preferably $R^1$ denotes an unsubstituted, linear alkyl radical having 6, 7, 8, 9, 10, 11, 12, 13, 14, 15, 16, 17 or 18 carbon atoms. More preferably $R^1$ denotes an unsubstituted, linear alkyl radical having 8, 9, 10, 11, 12, 13, 14, 15 or 16 carbon atoms. Most preferably $R^1$ denotes an unsubstituted, linear alkyl radical having 8, 9, 10, 11 or 12 carbon atoms.

In case the alkoxylated polytetrahydrofurane comprises units, wherein $R^2$ denotes —$CH_2$—$CH_3$, the ratio of (n+n') to k is in the range of 1.5:1 to 10:1, more preferably in the range of 1.5:1 to 6:1, most preferably in the range of 2:1 to 5:1.

In case the alkoxylated polytetrahydrofurane comprises units, wherein $R^3$ denotes —$CH_3$, the ratio of (p+p') to k is in the range of 1.2:1 to 10:1, more preferably in the range of 1.2:1 to 6:1.

In another preferred embodiment the presently claimed invention is directed to the use of an alkoxylated polytetrahydrofurane of general formula (I)

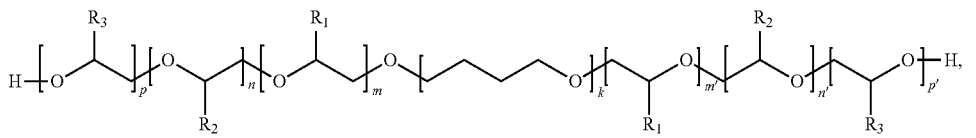

(I)

wherein
m is an integer in the range of ≥1 to ≤30,
m' is an integer in the range of ≥1 to ≤30,
(m+m') is an integer in the range of ≥3 to ≤50,
n is an integer in the range of ≥3 to ≤45,
n' is an integer in the range of ≥3 to ≤45,
(n+n') is an integer in the range of ≥6 to ≤90,
p is an integer in the range of ≥0 to ≤75,
p' is an integer in the range of ≥0 to ≤75,
k is an integer in the range of ≥3 to ≤25,
(p+p') is an integer in the range of ≥0 to ≤30,
k is an integer in the range of ≥3 to ≤25,
$R^1$ denotes an unsubstituted, linear alkyl radical having 6, 7, 8, 9, 10, 11, 12, 13, 14, 15, 16, 17 or 18 carbon atoms,
$R^2$ denotes —$CH_2$—$CH_3$, and
$R^3$ denotes —$CH_3$,
whereby the concatenations denoted by k are distributed to form a block polymeric structure and the concatenations denoted by p, p', n, n', m and m' are distributed to form a block polymeric structure or a random polymeric structure.

In a more preferred embodiment the presently claimed invention is directed to the use of an alkoxylated polytetrahydrofurane of general formula (I)

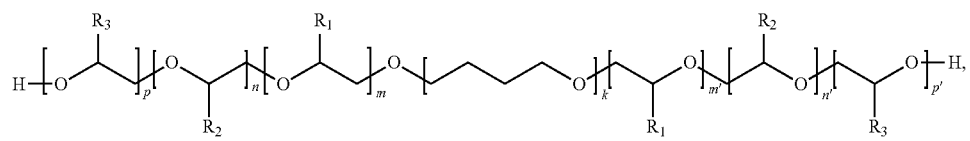

(I)

wherein
m is an integer in the range of ≥1 to ≤30,
m' is an integer in the range of ≥1 to ≤30,
(m+m') is an integer in the range of ≥3 to ≤50,
n is an integer in the range of ≥3 to ≤45,
n' is an integer in the range of ≥3 to 45,
(n+n') is an integer in the range of ≥6 to ≤90,
p is an integer in the range of ≥0 to ≤75,
p' is an integer in the range of ≥0 to ≤75,
k is an integer in the range of ≥3 to 25,
(p+p') is an integer in the range of ≥0 to ≤30,
k is an integer in the range of ≥3 to ≤25,
$R^1$ denotes an unsubstituted, linear alkyl radical having 6, 7, 8, 9, 10, 11, 12, 13, 14, 15, 16, 17 or 18 carbon atoms,
$R^2$ denotes —$CH_2$—$CH_3$, and
$R^3$ denotes —$CH_3$,
whereby the concatenations denoted by k are distributed to form a block polymeric structure and the concatenations denoted by p, p', n, n', m and m' are distributed to form a block polymeric structure or a random polymeric structure, wherein the ratio of (m+m') to k is in the range of 0.3:1 to 6:1 and the ratio of (n+n') to k is in the range of 1.5:1 to 10:1.

In a most preferred embodiment the presently claimed invention is directed to the use of an alkoxylated polytetrahydrofurane of general formula (I)

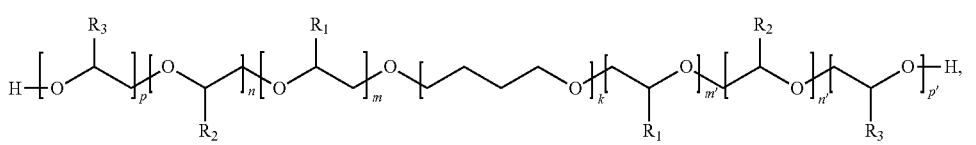

(I)

wherein
m is an integer in the range of ≥1 to ≤25,
m' is an integer in the range of ≥1 to ≤25,
(m+m') is an integer in the range of ≥3 to ≤40,
n is an integer in the range of ≥6 to ≤40,
n' is an integer in the range of ≥6 to ≤40,
(n+n') is an integer in the range of ≥12 to ≤70,
p is an integer in the range of ≥0 to ≤25,
p' is an integer in the range of ≥0 to ≤25,
(p+p') is an integer in the range of ≥0 to ≤30,
k is an integer in the range of ≥5 to ≤20,
$R^1$ denotes an unsubstituted, linear alkyl radical having 8, 9, 10, 11 or 12 carbon atoms,
$R^2$ denotes —$CH_2$—$CH_3$, and
$R^3$ denotes —$CH_3$,
whereby the concatenations denoted by k are distributed to form a block polymeric structure and the concatenations denoted by p, p', n, n', m and m' are distributed to form a block polymeric structure or a random polymeric structure, wherein the ratio of (m+m') to k is in the range of 0.3:1 to 4:1 and the ratio of (n+n') to k is in the range of 1.5:1 to 5:1.

In another preferred embodiment the presently claimed invention is directed to the use of an alkoxylated polytetrahydrofurane of general formula (I)

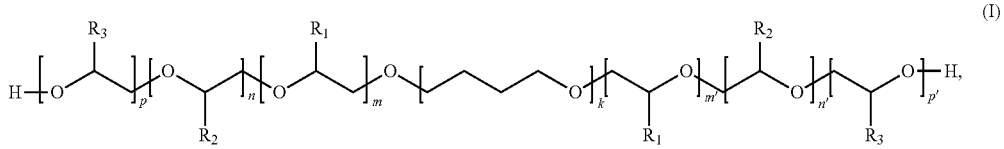
(I)

wherein
m is an integer in the range of ≥1 to ≤25,
m' is an integer in the range of ≥1 to ≤25,
(m+m') is an integer in the range of ≥3 to ≤50,
n is an integer in the range of ≥0 to ≤45,
n' is an integer in the range of ≥0 to ≤45,
(n+n') is an integer in the range of ≥0 to ≤80,
p is an integer in the range of ≥3 to ≤45,
p' is an integer in the range of ≥3 to ≤45,
(p+p') is an integer in the range of ≥6 to ≤90,
k is an integer in the range of ≥3 to ≤25,
$R^1$ denotes an unsubstituted, linear alkyl radical having 6, 7, 8, 9, 10, 11, 12, 13, 14, 15, 16, 17 or 18 carbon atoms,
$R^2$ denotes —CH$_2$—CH$_3$, and
$R^3$ denotes —CH$_3$,
whereby the concatenations denoted by k are distributed to form a block polymeric structure and the concatenations denoted by p, p', n, n', m and m' are distributed to form a block polymeric structure or a random polymeric structure.

In a more preferred embodiment the presently claimed invention is directed to the use of an alkoxylated polytetrahydrofurane of general formula (I)

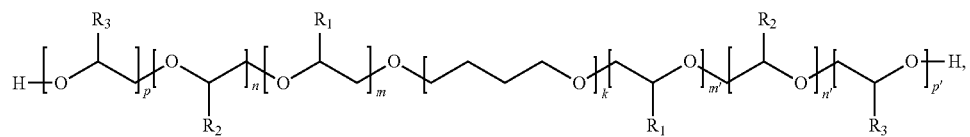
(I)

wherein
m is an integer in the range of ≥1 to ≤30,
m' is an integer in the range of ≥1 to ≤30,
(m+m') is an integer in the range of ≥3 to ≤50,
n is an integer in the range of ≥0 to ≤45,
n' is an integer in the range of ≥0 to ≤45,
(n+n') is an integer in the range of ≥0 to ≤80,
p is an integer in the range of ≥3 to ≤45,
p' is an integer in the range of ≥3 to ≤45,
(p+p') is an integer in the range of ≥6 to ≤90,
k is an integer in the range of ≥3 to ≤25,
$R^1$ denotes an unsubstituted, linear alkyl radical having 6, 7, 8, 9, 10, 11, 12, 13, 14, 15, 16, 17 or 18 carbon atoms,
$R^2$ denotes —CH$_2$—CH$_3$, and
$R^3$ denotes —CH$_3$,
whereby the concatenations denoted by k are distributed to form a block polymeric structure and the concatenations denoted by p, p', n, n', m and m' are distributed to form a block polymeric structure or a random polymeric structure, wherein the ratio of (m+m') to k is in the range of 0.3:1 to 6:1 and the ratio of (p+p') to k is in the range of 1.5:1 to 10:1.

In a most preferred embodiment the presently claimed invention is directed to the use of an alkoxylated polytetrahydrofurane of general formula (I)

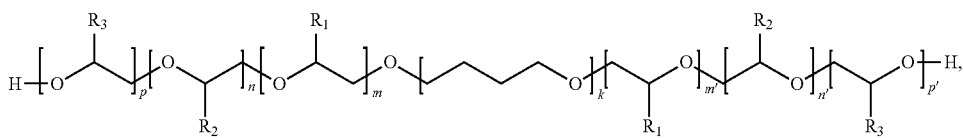
(I)

wherein
m is an integer in the range of ≥1 to ≤25,
m' is an integer in the range of ≥1 to ≤25,
(m+m') is an integer in the range of ≥3 to ≤50,
n is an integer in the range of ≥0 to ≤45,
n' is an integer in the range of ≥0 to ≤45,
(n+n') is an integer in the range of ≥0 to ≤80,
p is an integer in the range of ≥5 to ≤20,
p' is an integer in the range of ≥5 to ≤20,
(p+p') is an integer in the range of ≥10 to ≤30,
k is an integer in the range of ≥5 to ≤20,
$R^1$ denotes an unsubstituted, linear alkyl radical having 8, 9, 10, 11 or 12 carbon atoms,
$R^2$ denotes —CH$_2$—CH$_3$, and
$R^3$ denotes —CH$_3$,
whereby the concatenations denoted by k are distributed to form a block polymeric structure and the concatenations denoted by p, p', n, n', m and m' are distributed to form a block polymeric structure or a random polymeric structure, wherein the ratio of (m+m') to k is in the range of 0.3:1 to 4:1 and the ratio of (p+p') to k is in the range of 1.5:1 to 5:1.

The alkoxylated polytetrahydrofuranes mentioned are obtained by reacting at least one polytetrahydrofurane block polymer with at least one $C_8$-$C_{30}$ epoxy alkane and optionally at least one epoxide selected from the group consisting of ethylene oxide, propylene oxide and butylene oxide in the presence of at least one catalyst. In case at least one epoxide selected from the group consisting of ethylene oxide, propylene oxide and butylene oxide is used, the at least one $C_8$-$C_{30}$ epoxy alkane and the at least one epoxide selected from the group consisting of ethylene oxide, propylene oxide and butylene oxide can either be added as a mixture of epoxides to obtain a random copolymer or in portions, whereby each portion contains a different epoxide, to obtain a block copolymer.

Preferably the at least one $C_8$-$C_{30}$ epoxy alkane is selected from the group consisting of 1,2-epoxyoctane; 1,2-epoxynonane; 1,2-epoxydecane; 1,2-epoxyundecane; 1,2-epoxy-dodecane; 1,2-epoxytridecane; 1,2-epoxytetradecane; 1,2-epoxypentadecane; 1,2-epoxyhexadecane; 1,2-epoxyheptadecane; 1,2-epoxyoctadecane; 1,2-epoxynonade-cane; 1,2-epoxyicosane; 1,2-epoxyunicosane; 1,2-epoxydocosane; 1,2-epoxytricosane; 1,2-epoxytetracosane; 1,2-epoxypentacosane; 1,2-epoxyhexacosane; 1,2-epoxyheptacosane; 1,2-epoxyoctacosane; 1,2-epoxynonacosane and 1,2-epoxytriacontane.

Preferably the at least one catalyst is a base or a double metal cyanide catalyst (DMC catalyst). More preferably the at least one catalyst is selected from the group consisting of alkaline earth metal hydroxides such as calcium hydroxide, strontium hydroxide and barium hydroxide, alkali metal hydroxides such as lithium hydroxide, sodium hydroxide, potassium hydroxide, rubidium hydroxide and caesium hydroxide and alkali metal alkoxylates such as potassium tert-butoxylate. Most preferably the at least one catalyst is sodium hydroxide or potassium tert-butoxylate. Most preferably the at least one catalyst is potassium tert-butoxylate.

In case the catalyst is a base, any inert solvents capable of dissolving alkoxylated polytetrahydrofurane and polytetrahydrofurane may be used as solvents during the reaction or as solvents required for working up the reaction mixture in cases where the reaction is carried out without solvents. The following solvents are mentioned as examples: methylene chloride, trichloroethylene, tetrahydrofuran, dioxane, methyl ethyl ketone, methylisobutyl ketone, ethyl acetate and isobutyl acetate.

In case the catalyst is a base, the amount of catalysts used is preferably in the range from 0.01 to 1.0, more preferably in the range from 0.05 to 0.5, % by weight, based on the total amount of the alkoxylated polytetrahydrofurane. The reaction is preferably carried out at a temperature in the range of 70 to 200° C., more preferably from 100 to 160° C. The pressure is preferably in the range from 1 bar to 150 bar, more preferably in the range from 3 to 30 bar.

In case a DMC catalyst is used, it is in principle possible to use all types of DMC catalysts known from the prior art. Preference is given to using double metal cyanide catalysts of the general formula (1):

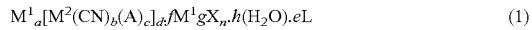

$$M^1_a[M^2(CN)_b(A)_c]_d \cdot f M^1 g X_n \cdot h(H_2O) \cdot eL \quad (1)$$

wherein $M^1$ is a metal ion selected from the group comprising $Zn^{2+}$, $Fe^{2+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{5+}$, $Sr^{2+}$, $W^{6+}$, $Cr^{2+}$, $Cr^{3+}$ and $Cd^{2+}$, $M^2$ is a metal ion selected from the group comprising $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$ and $Ir^{3+}$, $M^1$ and $M^2$ are identical or different, A is an anion selected from the group comprising halide, hydroxide, sulfate, carbonate, cyanide, thiocyanate, isocyanate, cyanate, carboxylate, oxalate and nitrate, X is an anion selected from the group comprising halide, hydroxide, sulfate, carbonate, cyanide, thiocyanate, isocyanate, cyanate, carboxylate, oxalate and nitrate, L is a water-miscible ligand selected from the group comprising alcohols, aldehydes, ketones, ethers, polyethers, esters, ureas, amides, nitriles and sulfides, and a, b, c, d, g and n are selected so that the compound is electrically neutral and e is the coordination number of the ligand or zero, f is a fraction or integer greater than or equal to zero, h is a fraction or integer greater than or equal to zero.

Such compounds are generally known and can be prepared, for example, by the process described in EP 0 862 947 B1 by combining the aqueous solution of a water-soluble metal salt with the aqueous solution of a hexacyanometallate compound, in particular of a salt or an acid, and, if necessary, adding a water-soluble ligand thereto either during or after the combination of the two solutions.

DMC catalysts are usually prepared as a solid and used as such. The catalyst is typically used as powder or in suspension. However, other ways known to those skilled in the art for using catalysts can likewise be employed. In a preferred embodiment, the DMC catalyst is dispersed with an inert or non-inert suspension medium which can be, for example, the product to be produced or an intermediate by suitable measures, e.g. milling. The suspension produced in this way is used, if appropriate after removal of interfering amounts of water by methods known to those skilled in the art, e.g. stripping with or without use of inert gases such as nitrogen and/or noble gases. Suitable suspension media are, for example, toluene, xylene, tetrahydrofuran, acetone, 2-methyl-pentanone, cyclohexanone and also polyether alcohols according to the invention and mixtures thereof. The catalyst is preferably used in a suspension in a polyol as described, for example, in EP 0 090 444 A.

The present invention also provides a fuel composition which comprises, in a major amount, a gasoline fuel and, in a minor amount, at least one alkoxylated polytetra-hydrofurane of general formula (I), and at least one fuel additive which is different from the alkoxylated polytetrahydrofurane (I) and has detergent action.

Typically, the amount of this at least one alkoxylated polytetrahydrofurane in the gasoline fuel is 10 to 5000 ppm by weight, more preferably 20 to 2000 ppm by weight, even more preferably 30 to 1000 ppm by weight and especially 40 to 500 ppm by weight, for example 50 to 300 ppm by weight.

Useful gasoline fuels include all conventional gasoline fuel compositions. A typical representative which shall be mentioned here is the Eurosuper base fuel to EN 228, which is customary on the market. In addition, gasoline fuel compositions of the specification according to WO 00/47698 are also possible fields of use for the present invention. In addition, in the context of the present invention, gasoline fuels shall also be understood to mean alcohol-containing gasoline fuels, especially ethanol-containing gasoline fuels, as described, for example, in WO 2004/090079, for example Flex fuel with an ethanol content of 75 to 85% by volume, or gasoline fuel comprising 85% by volume of ethanol ("E85"), but also the "E100" fuel type, which is typically azeotropically distilled ethanol and thus consists of approx. 96% by volume of $C_2H_5OH$ and approx. 4% by volume of $H_2O$.

The alkoxylated polytetrahydrofurane (I) mentioned may be added to the particular base fuel either alone or in the form of fuel additive packages (for gasoline fuels also called "gasoline performance packages"). Such packages are fuel additive concentrates and generally also comprise, as well as solvents, and as well as the at least one fuel additive which is different from the alkoxylated polytetrahydrofurane (I) and has detergent action, a series of further components as coadditives, which are especially carrier oils, corrosion inhibitors, demulsifiers, dehazers, antifoams, combustion improvers, antioxidants or stabilizers, antistats, metallocenes, metal deactivators, solubilizers, markers and/or dyes.

Detergents or detergent additives as the at least one fuel additive which is different from the alkoxylated polytetrahydrofurane (I) and has detergent action, referred to hereinafter as component (D), typically refer to deposition inhibitors for fuels. The detergent additives are preferably amphiphilic substances which possess at least one hydrophobic hydrocarbyl radical having a number-average molecular weight ($M_n$) of 85 to 20 000, especially of 300 to 5000, in particular of 500 to 2500, and at least one polar moiety.

In a preferred embodiment, the inventive fuel composition comprises, as the at least one fuel additive (D) which is different from the alkoxylated polytetrahydrofurane (I) and has detergent action, at least one representative which is selected from:
(Da) mono- or polyamino groups having up to 6 nitrogen atoms, at least one nitrogen atom having basic properties;
(Db) nitro groups, optionally in combination with hydroxyl groups;
(Dc) hydroxyl groups in combination with mono- or polyamino groups, at least one nitrogen atom having basic properties;
(Dd) carboxyl groups or their alkali metal or alkaline earth metal salts;
(De) sulfo groups or their alkali metal or alkaline earth metal salts;
(Df) polyoxy-$C_2$-$C_4$-alkylene moieties terminated by hydroxyl groups, mono- or polyamino groups, at least one nitrogen atom having basic properties, or by carbamate groups;
(Dg) carboxylic ester groups;
(Dh) moieties derived from succinic anhydride and having hydroxyl and/or amino and/or amido and/or imido groups; and/or
(Di) moieties obtained by Mannich reaction of substituted phenols with aldehydes and mono- or polyamines.

The hydrophobic hydrocarbon radical in the above detergent additives, which ensures the adequate solubility in the fuel composition, has a number-average molecular weight ($M_n$) of 85 to 20 000, especially of 300 to 5000, in particular of 500 to 2500. Useful typical hydrophobic hydrocarbyl radicals, especially in conjunction with the polar moieties (Da), (Dc), (Dh) and (Di), are relatively long-chain alkyl or alkenyl groups, especially the polypropenyl, polybutenyl and polyisobutenyl radicals each having $M_n$=300 to 5000, especially 500 to 2500, in particular 700 to 2300.

Examples of the above groups of detergent additives include the following:

Additives comprising mono- or polyamino groups (Da) are preferably polyalkenemono- or poly-alkenepolyamines based on polypropene or on highly-reactive (i.e. having predominantly terminal double bonds in the α- and/or β-position such as vinylidene double bonds) or conventional (i.e. having predominantly internal double bonds) polybutene or polyisobutene having $M_n$=300 to 5000. Such detergent additives based on highly-reactive polybutene or polyisobutene, which are normally prepared by hydroformylation of the poly(iso)butene and subsequent reductive amination with ammonia, monoamines or polyamines, are known from EP-A 244 616. When the preparation of the additives proceeds from polybutene or polyisobutene having predominantly internal double bonds (usually in the β- and/or γ-positions), one possible preparative route is by chlorination and subsequent amination or by oxidation of the double bond with air or ozone to give the carbonyl or carboxyl compound and subsequent amination under reductive (hydrogenating) conditions. The amines used here for the amination may be, for example, ammonia, monoamines or polyamines such as dimethylaminopropylamine, ethylenediamine, diethylenetriamine, triethylenetetramine or tetraethylenepentamine. Corresponding additives based on polypropene are described in particular in WO-A-94/24231.

Further preferred additives comprising monoamino groups (Da) are the hydrogenation products of the reaction products of polyisobutenes having an average degree of polymerization P=5 to 100 with nitrogen oxides or mixtures of nitrogen oxides and oxygen, as described in particular in WO-A-97/03946.

Further preferred additives comprising monoamino groups (Da) are the compounds obtainable from polyisobutene epoxides by reaction with amines and subsequent dehydration and reduction of the amino alcohols, as described in particular in DE-A-196 20 262.

Additives comprising nitro groups (Db), optionally in combination with hydroxyl groups, are preferably reaction products of polyisobutenes having an average degree of polymerization P=5 to 100 or 10 to 100 with nitrogen oxides or mixtures of nitrogen oxides and oxygen, as described in particular in WO-A-96/03367 and in WO-A 96/03479. These reaction products are generally mixtures of pure nitropolyisobutenes (e.g. α,β-dinitropolyisobutene) and mixed hydroxynitropolyisobutenes (e.g. α-nitro-β-hydroxypolyisobutene).

Additives comprising hydroxyl groups in combination with mono- or polyamino groups (Dc) are in particular reaction products of polyisobutene epoxides obtainable from polyisobutene having preferably predominantly terminal double bonds and $M_n$=300 to 5000, with ammonia or mono- or polyamines, as described in particular in EP-A-476 485.

Additives comprising carboxyl groups or their alkali metal or alkaline earth metal salts (Dd) are preferably copolymers of $C_2$-$C_{40}$-olefins with maleic anhydride which have a total molar mass of 500 to 20 000 and some or all of whose carboxyl groups have been converted to the alkali metal or alkaline earth metal salts and any remainder of the carboxyl groups has been reacted with alcohols or amines. Such additives are disclosed in particular by EP-A-307 815. Such additives serve mainly to prevent valve seat wear and can, as described in WO-A-87/01126, advantageously be used in combination with customary fuel detergents such as poly(iso)buteneamines or polyetheramines.

Additives comprising sulfo groups or their alkali metal or alkaline earth metal salts (De) are preferably alkali metal or alkaline earth metal salts of an alkyl sulfosuccinate, as described in particular in EP-A-639 632. Such additives serve mainly to prevent valve seat wear and can be used advantageously in combination with customary fuel detergents such as poly(iso)buteneamines or polyetheramines.

Additives comprising polyoxy-$C_2$-$C_4$-alkylene moieties (Df) are preferably polyethers or polyetheramines which are obtainable by reaction of $C_2$-$C_{60}$-alkanols, $C_6$-$C_{30}$-alkanediols, mono- or di-$C_2$-$C_{30}$-alkylamines, $C_1$-$C_{30}$-alkylcyclohexanols or $C_1$-$C_{30}$-alkylphenols with 1 to 30 mol of ethylene oxide and/or propylene oxide and/or butylene oxide per hydroxyl group or amino group and, in the case of the polyetheramines, by subsequent reductive amination with ammonia, monoamines or polyamines. Such products are described in particular in EP-A-310 875, EP-A-356 725, EP-A-700 985 and U.S. Pat. No. 4,877,416. In the case of polyethers, such products also have carrier oil properties. Typical examples of these are tridecanol butoxylates, isotridecanol butoxylates, isononyl-phenol butoxylates and polyisobutenol butoxylates and propoxylates and also the corresponding reaction products with ammonia.

Additives comprising carboxylic ester groups (Dg) are preferably esters of mono-, di- or tricarboxylic acids with long-chain alkanols or polyols, in particular those having a minimum viscosity of 2 mm$^2$/s at 100° C., as described in particular in DE-A-38 38 918. The mono-, di- or tricarboxylic acids used may be aliphatic or aromatic acids, and particularly suitable ester alcohols or ester polyols are long-chain representatives having, for example, 6 to 24 carbon atoms. Typical representatives of the esters are adipates, phthalates, isophthalates, terephthalates and trimellitates of isooctanol, of isononanol, of isodecanol and of isotridecanol. Such products also have carrier oil properties.

Additives comprising moieties derived from succinic anhydride and having hydroxyl and/or amino and/or amido and/or imido groups (Dh) are preferably corresponding derivatives of alkyl- or alkenyl-substituted succinic anhydride and especially the corresponding derivatives of polyisobutenylsuccinic anhydride which are obtainable by reacting conventional or high-reactivity poly-isobutene having $M_n$=300 to 5000 with maleic anhydride by a thermal route or via the chlorinated polyisobutene. Of particular interest in this context are derivatives with aliphatic polyamines such as ethylenediamine, diethylenetriamine, triethylenetetramine or tetraethylenepentamine. The moieties having hydroxyl and/or amino and/or amido and/or imido groups are, for example, carboxylic acid groups, acid amides of monoamines, acid amides of di- or polyamines which, in addition to the amide function, also have free amine groups, succinic acid derivatives having an acid and an amide function, carboximides with monoamines, carboximides with di- or polyamines which, in addition to the imide function, also have free amine groups, or diimides which are formed by the reaction of di- or polyamines with two succinic acid derivatives. Such fuel additives are described especially in U.S. Pat. No. 4,849,572.

The detergent additives from group (Dh) are preferably the reaction products of alkyl- or alkenyl-substituted succinic anhydrides, especially of polyisobutenylsuccinic anhydrides ("PIBSAs"), with amines and/or alcohols. These are thus derivatives which are derived from alkyl-, alkenyl- or polyisobutenylsuccinic anhydride and have amino and/or amido and/or imido and/or hydroxyl groups. It is self-evident that these reaction products are obtainable not only when substituted succinic anhydride is used, but also when substituted succinic acid or suitable acid derivatives, such as succinyl halides or succinic esters, are used.

The additized fuel preferably comprises at least one detergent based on a polyisobutenyl-substituted succinimide. Especially of interest are the imides with aliphatic polyamines. Particularly preferred polyamines are ethylenediamine, diethylenetriamine, triethylenetetramine, pentaethylenehexamine and in particular tetraethylenepentamine. The polyisobutenyl radical has a number-average molecular weight $M_n$ of preferably from 500 to 5000, more preferably from 500 to 2000 and in particular of about 1000.

Additives comprising moieties (Di) obtained by Mannich reaction of substituted phenols with aldehydes and mono- or polyamines are preferably reaction products of polyisobutene-substituted phenols with formaldehyde and mono- or polyamines such as ethylenediamine, diethylenetriamine, triethylenetetramine, tetraethylenepentamine or dimethylaminopropylamine. The polyisobutenyl-substituted phenols may originate from conventional or high-reactivity polyisobutene having $M_n$=300 to 5000. Such "polyisobutene Mannich bases" are described especially in EP-A-831 141.

The inventive fuel composition comprises the at least one fuel additive which is different than the inventive reaction product and has detergent action, and is normally selected from the above groups (Da) to (Di), in an amount of typically 10 to 5000 ppm by weight, more preferably of 20 to 2000 ppm by weight, even more preferably of 30 to 1000 ppm by weight and especially of 40 to 500 ppm by weight, for example of 50 to 250 ppm by weight.

The detergent additives (D) mentioned are preferably used in combination with at least one carrier oil. In a preferred embodiment, the inventive fuel composition comprises, in addition to the at least one inventive reaction product and the at least one fuel additive which is different than the inventive reaction product and has detergent action, as a further fuel additive in a minor amount, at least one carrier oil.

Suitable mineral carrier oils are the fractions obtained in crude oil processing, such as brightstock or base oils having viscosities, for example, from the SN 500-2000 class; but also aromatic hydrocarbons, paraffinic hydrocarbons and alkoxyalkanols. Likewise useful is a fraction which is obtained in the refining of mineral oil and is known as "hydrocrack oil" (vacuum distillate cut having a boiling range of from about 360 to 500° C., obtainable from natural mineral oil which has been catalytically hydrogenated under high pressure and isomerized and also deparaffinized). Likewise suitable are mixtures of abovementioned mineral carrier oils.

Examples of suitable synthetic carrier oils are selected from: polyolefins (poly-alpha-olefins or poly(internal olefin)s), (poly)esters, (poly)alkoxylates, polyethers, aliphatic polyetheramines, alkylphenol-started polyethers, alkylphenol-started polyetheramines and carboxylic esters of long-chain alkanols.

Examples of suitable polyolefins are olefin polymers having $M_n$=from 400 to 1800, in particular based on polybutene or polyisobutene (hydrogenated or unhydrogenated).

Examples of suitable polyethers or polyetheramines are preferably compounds comprising polyoxy-$C_2$-$C_4$-alkylene moieties which are obtainable by reacting $C_2$-$C_{60}$-alkanols, $C_6$-$C_{30}$-alkanediols, mono- or di-$C_2$-$C_{30}$-alkylamines, $C_1$-$C_{30}$-alkylcyclohexanols or $C_1$-$C_{30}$-alkylphenols with from 1 to 30 mol of ethylene oxide and/or propylene oxide and/or butylene oxide per hydroxyl group or amino group, and, in the case of the polyetheramines, by subsequent reductive amination with ammonia, monoamines or polyamines. Such products are described in particular in EP-A-310 875, EP-A-356 725, EP-A-700 985 and U.S. Pat. No. 4,877,416. For example, the polyether-amines used may be poly-$C_2$-$C_6$-alkylene oxide amines or functional derivatives thereof. Typical examples thereof are tridecanol butoxylates or isotridecanol butoxylates, isononylphenol butoxylates and also polyisobutenol butoxylates and propoxylates, and also the corresponding reaction products with ammonia.

Examples of carboxylic esters of long-chain alkanols are in particular esters of mono-, di- or tricarboxylic acids with long-chain alkanols or polyols, as described in particular in DE-A-38 38 918. The mono-, di- or tricarboxylic acids used may be aliphatic or aromatic acids; suitable ester alcohols or polyols are in particular long-chain representatives having, for example, from 6 to 24 carbon atoms. Typical representatives of the esters are adipates, phthalates, isophthalates, terephthalates and trimellitates of isooctanol, isononanol, isodecanol and isotridecanol, for example di(n- or isotridecyl) phthalate.

Further suitable carrier oil systems are described, for example, in DE-A-38 26 608, DE-A-41 42 241, DE-A-43 09 074, EP-A-0 452 328 and EP-A-0 548 617.

Examples of particularly suitable synthetic carrier oils are alcohol-started polyethers having from about 5 to 35, for example from about 5 to 30, $C_3$-$C_6$-alkylene oxide units, for example selected from propylene oxide, n-butylene oxide and isobutylene oxide units, or mixtures thereof. Nonlimiting examples of suitable starter alcohols are long-chain alkanols or phenols substituted by long-chain alkyl in which the long-chain alkyl radical is in particular a straight-chain or branched $C_6$-$C_{18}$-alkyl radical. Preferred examples include tridecanol and nonylphenol.

Further suitable synthetic carrier oils are alkoxylated alkylphenols, as described in DE-A-101 02 913.

Preferred carrier oils are synthetic carrier oils, particular preference being given to poly-ethers.

When a carrier oil is used in addition, it is added to the inventive additized fuel in an amount of preferably from 1 to 1000 ppm by weight, more preferably from 10 to 500 ppm by weight and in particular from 20 to 100 ppm by weight.

In a preferred embodiment, the inventive fuel composition comprises, in addition to the at least one inventive reaction product, the at least one fuel additive which is different from the alkoxylated polytetrahydrofurane (I) mentioned and has detergent action, and optionally the at least one carrier oil, as a further fuel additive in a minor amount at least one tertiary hydrocarbyl amine of formula $NR^4R^5R^6$ wherein $R^4$, $R^5$ and $R^6$ are the same or different $C_1$- to $C_{20}$-hydrocarbyl residues with the proviso that the overall number of carbon atoms in formula (I) does not exceed 30.

Tertiary hydrocarbyl amines have proven to be advantageous with regard to use as performance additives in fuels controlling deposits. Besides their superior performance behavior, they are also good to handle as their melting points are normally low enough to be usually liquid at ambient temperature.

"Hydrocarbyl residue" for $R^4$ to $R^6$ shall mean a residue which is essentially composed of carbon and hydrogen, however, it can contain in small amounts heteroatoms, especially oxygen and/or nitrogen, and/or functional groups, e.g. hydroxyl groups and/or carboxylic groups, to an extent which does not distort the predominantly hydrocarbon character of the residue. Hydrocarbyl residues are preferably alkyl, alkenyl, alkinyl, cycloalkyl, aryl, alkylaryl or arylalkyl groups. Especially preferred hydrocarbyl residues for $R^4$ to $R^6$ are linear or branched alkyl or alkenyl groups.

The overall number of carbon atoms in the tertiary hydrocarbyl amine mentioned is at most 30, preferably at most 27, more preferably at most 24, most preferably at most 20. Preferably, the minimum overall number of carbon atoms in formula $NR^4R^5R^6$ is 6, more preferably 8, most preferably 10. Such size of the tertiary hydrocarbyl amine mentioned corresponds to molecular weight of about 100 to about 450 for the largest range and of about 150 to about 300 for the smallest range; most usually, tertiary hydrocarbyl amines mentioned within a molecular range of from 100 to 300 are used.

The three $C_1$- to $C_{20}$-hydrocarbyl residues may be identical or different. Preferably, they are different, thus creating an amine molecular which exhibits an oleophobic moiety (i.e. the more polar amino group) and an oleophilic moiety (i.e. a hydrocarbyl residue with a longer chain length or a larger volume). Such amine molecules with oleophobic/oleophilic balance have proved to show the best deposit control performance according the present invention.

Preferably, a tertiary hydrocarbyl amine of formula $NR^4R^5R^6$ is used wherein at least two of hydrocarbyl residues $R^4$, $R^5$ and $R^6$ are different with the proviso that the hydrocarbyl residue with the most carbon atoms differ in carbon atom number from the hydrocarbyl residue with the second most carbon atoms in at least 3, preferably in at least 4, more preferably in at least 6, most preferably in at least 8. Thus, the tertiary amines mentioned exhibit hydrocarbyl residues of two or three different chain length or different volume, respectively.

Still more preferably, a tertiary hydrocarbyl amine of formula $NR^4R^5R^6$ is used wherein one or two of $R^4$ to $R^6$ are $C_7$- to $C_{20}$-hydrocarbyl residues and the remaining two or one of $R^4$ to $R^6$ are $C_1$- to $C_4$-hydrocarbyl residues.

The one or the two longer hydrocarbyl residues, which may be in case of two residues identical or different, exhibit from 7 to 20, preferably from 8 to 18, more preferably from 9 to 16, most preferably from 10 to 14 carbon atoms. The one or the two remaining shorter hydrocarbyl residues, which may be in case of two residues identical or different, exhibit from 1 to 4, preferably from 1 to 3, more preferably 1 or 2, most preferably 1 carbon atom(s). Besides the desired deposit controlling performance, the oleophilic long-chain hydrocarbyl residues provide further advantageous properties to the tertiary amines, i.e. high solubility for gasoline fuels and low volatility.

More preferably, tertiary hydrocarbyl amines of formula $NR^4R^5R^6$ are used, wherein $R^4$ is a $C_8$- to $C_{18}$-hydrocarbyl residue and $R^5$ and $R^6$ are independently of each other $C_1$- to $C_4$-alkyl radicals. Still more preferably, tertiary hydrocarbyl amines of formula $NR^4R^5R^6$ are used, wherein $R^4$ is a $C_9$- to $C_{16}$-hydrocarbyl residue and $R^5$ and $R^6$ are both methyl radicals.

Examples for suitable linear or branched $C_1$- to $C_{20}$-alkyl residues for $R^4$ to $R^6$ are: methyl, ethyl, n-propyl, iso-propyl, n-butyl, iso-butyl, sec.-butyl, tert-butyl, n-pentyl, tert-pentyl, 2-methylbutyl, 3-methylbutyl, 1,1-dimethylpropyl, 1,2-dimethylpropyl, n-hexyl, 2-methylpentyl, 3-methylpentyl, 4-methylpentyl, 1,1-dimethylbutyl, 1,2-dimethylbutyl, 1,3-dimethylbutyl, 2-ethylbutyl, n-heptyl, 1-methylhexyl, 2-methylhexyl, 3-methylhexyl, 4-methylhexyl, 5-methylhexyl, 1,1-dimethylpentyl, 1,2-dimethylpentyl, 2,2-dimethylpentyl, 2,3-dimethylpentyl, 2,4-dime-thylpentyl, 2,5-dimethylpentyl, 2-diethylpentyl, 3-diethyl-pentyl, n-octyl, 1-methylheptyl, 2-methylheptyl, 3-methylheptyl, 4-methylheptyl, 5-methylheptyl, 6-methylheptyl, 1,1-dimethylhexyl, 1,2-dimethylhexyl, 2,2-dimethylhexyl, 2,3-dimethylhexyl, 2,4-dimethyl-hexyl, 2,5-dimethylhexyl, 2,6-dimethylhexyl, 2-ethyl-hexyl, 3-ethylhexyl, 4-ethylhexyl, n-nonyl, iso-nonyl, n-decyl, 1-propylheptyl, 2-propyl-heptyl, 3-propylheptyl, n-undecyl, n-dodecyl, n-tridecyl, iso-tridecyl, tetradecyl, pentadecyl, hexadecyl, heptadecyl, octadecyl, nonadecyl and eicosyl.

Examples for suitable linear or branched $C_2$- to $C_{20}$-alkenyl and -alkinyl residues for $R^4$ to $R^6$ are: vinyl, allyl, oleyl and propin-2-yl.

Tertiary hydrocarbyl amines of formula $NR^4R^5R^6$ with long-chain alkyl and alkenyl residues can also preferably be obtained or derived from natural sources, i.e. from plant or animal oils and lards. The fatty amines derived from such sources which are suitable as such tertiary hydrocarbyl amines normally form mixtures of different similar species such as homologues, e.g. tallow amines containing as main components tetradecyl amine, hexadecyl amine, octadecyl amine and octadecenyl amine (oleyl amine). Further examples of suitable fatty amines are: co-co amines and palm amines. Unsaturated fatty amines which contain alkenyl residues can be hydrogenated und used in this saturated form.

Examples for suitable $C_3$- to $C_{20}$-cycloalkyl residues for $R^4$ to $R^6$ are: cyclopropyl, cyclobutyl, 2-methylcyclohexyl, 3-methylcyclohexyl, 4-methylcyclohexyl, 2,3-dimethyl-cyclohexyl, 2,4-dimethylcyclohexyl, 2,5-dimethylcyclohexyl, 2,6-dimethylcyclohexyl, 3,4-dimethylcyclohexyl, 3,5-dimethylcyclohexyl, 2-ethylcyclohexyl, 3-ethylcyclohexyl, 4-ethylcyclohexyl, cyclooctyl and cyclodecyl.

Examples for suitable $C_7$- to $C_{20}$-aryl, -alkylaryl or -arylalkyl residues for $R^4$ to $R^6$ are: naphthyl, tolyl, xylyl, n-octylphenyl, n-nonylphenyl, n-decylphenyl, benzyl, 1-phenyl-ethyl, 2-phenylethyl, 3-phenylpropyl and 4-butylphenyl.

Typical examples for suitable tertiary hydrocarbyl amines of formula $NR^4R^5R^6$ are the following:

N,N-dimethyl-n-butylamine, N,N-dimethyl-n-pentylamine, N,N-dimethyl-n-hexylamine, N,N-dimethyl-n-heptylamine, N,N-dimethyl-n-octylamine, N,N-dimethyl-2-ethylhexyl-amine, N,N-di-methyl-n-nonylamine, N,N-dimethyl-iso-nonylamine, N,N-dimethyl-n-decylamine, N,N-dimethyl-2-propylheptylamine, N,N-dimethyl-n-undecylamine, N,N-dimethyl-n-dodecylamine, N,N-dimethyl-n-tridecylamine, N,N-dimethyl-iso-tridecyl-amine, N,N-di-methyl-n-tetradecylamine, N,N-dimethyl-n-hexadecylamine, N,N-di-methyl-n-octadecylamine, N,N-dimethyl-eicosylamine, N,N-dimethyl-oleylamine;

N,N-diethyl-n-heptylamine, N,N-diethyl-n-octylamine, N,N-diethyl-2-ethylhexylamine, N,N-diethyl-n-nonylamine, N,N-diethyl-iso-nonylamine, N,N-diethyl-n-decylamine, N,N-diethyl-2-propylheptylamine, N,N-diethyl-n-undecylamine, N,N-diethyl-n-dodecylamine, N,N-diethyl-n-tridecylamine, N,N-diethyl-iso-tridecylamine, N,N-diethyl-n-tetradecyl-amine, N,N-diethyl-n-hexadecylamine, N,N-di-ethyl-n-octadecylamine, N,N-diethyl-eicosylamine, N,N-diethyl-oleylamine;

N,N-di-(n-propyl)-n-heptylamine, N,N-di-(n-propyl)-n-octylamine, N,N-di-(n-propyl)-2-ethylhexylamine, N,N-di-(n-propyl)-n-nonylamine, N,N-di-(n-propyl)-iso-nonylamine, N,N-di-(n-propyl)-n-decylamine, N,N-di-(n-propyl)-2-propylheptylamine, N,N-di-(n-propyl)-n-undecylamine, N,N-di-(n-propyl)-n-dodecylamine, N,N-di-(n-propyl)-n-tridecylamine, N,N-di-(n-propyl)-iso-tridecylamine, N,N-di-(n-propyl)-n-tetradecylamine, N,N-di-(n-propyl)-n-hexadecylamine, N,N-di-(n-propyl)-n-octadecylamine, N,N-di-(n-propyl)-eicosylamine, N,N-di-(n-propyl)-oleylamine;

N,N-di-(n-butyl)-n-heptylamine, N,N-di-(n-butyl)-n-octylamine, N,N-di-(n-butyl)-2-ethylhexylamine, N,N-di-(n-butyl)-n-nonylamine, N,N-di-(n-butyl)-iso-nonylamine, N,N-di-(n-butyl)-n-decylamine, N,N-di-(n-butyl)-2-propylheptylamine, N,N-di-(n-butyl)-n-undecyl-amine, N,N-di-(n-butyl)-n-dodecylamine, N,N-di-(n-butyl)-n-tridecylamine, N,N-di-(n-butyl)-iso-tridecylamine, N,N-di-(n-butyl)-n-tetradecylamine, N,N-di-(n-butyl)-n-hexa-decylamine, N,N-di-(n-butyl)-n-octadecylamine, N,N-di-(n-butyl)-eicosylamine, N,N-di-(n-butyl)-oleyl-amine;

N-methyl-N-ethyl-n-heptylamine, N-methyl-N-ethyl-n-octylamine, N-methyl-N-ethyl-2-ethylhexylamine, N-methyl-N-ethyl-n-nonylamine, N-methyl-N-ethyl-iso-nonylamine, N-methyl-N-ethyl-n-decylamine, N-methyl-N-ethyl-2-propylheptylamine, N-methyl-N-ethyl-n-undecylamine, N-methyl-N-ethyl-n-dodecylamine, N-methyl-N-ethyl-n-tridecylamine, N-methyl-N-ethyl-iso-tridecylamine, N-methyl-N-ethyl-n-tetradecylamine, N-methyl-N-ethyl-n-hexadecylamine, N-methyl-N-ethyl-n-octadecylamine, N-methyl-N-ethyl-eicosyl-amine, N-methyl-N-ethyl-oleylamine;

N-methyl-N-(n-propyl)-n-heptylamine, N-methyl-N-(n-propyl)-n-octylamine, N-methyl-N-(n-propyl)-2-ethylhexylamine, N-methyl-N-(n-propyl)-n-nonylamine, N-methyl-N-(n-propyl)-iso-nonylamine, N-methyl-N-(n-propyl)-n-decylamine, N-methyl-N-(n-propyl)-2-propylheptylamine, N-methyl-N-(n-propyl)-n-undecylamine, N-methyl-N-(n-propyl)-n-dodecylamine, N-methyl-N-(n-propyl)-n-tridecylamine, N-methyl-N-(n-propyl)-iso-tri-decylamine, N-methyl-N-(n-propyl)-n-tetradecylamine, N-methyl-N-(n-propyl)-n-hexa-decylamine, N-methyl-N-(n-propyl)-n-octadecylamine, N-methyl-N-(n-propyl)-eicosyl-amine, N-methyl-N-(n-propyl)-oleylamine;

N-methyl-N-(n-butyl)-n-heptylamine, N-methyl-N-(n-butyl)-n-octylamine, N-methyl-N-(n-butyl)-2-ethylhexylamine, N-methyl-N-(n-butyl)-n-nonylamine, N-methyl-N-(n-butyl)-iso-nonylamine, N-methyl-N-(n-butyl)-n-decylamine, N-methyl-N-(n-butyl)-2-propylheptyl-amine, N-methyl-N-(n-butyl)-n-undecylamine, N-methyl-N-(n-butyl)-n-dodecylamine, N-methyl-N-(n-butyl)-n-tridecylamine, N-methyl-N-(n-butyl)-iso-tridecylamine, N-methyl-N-(n-butyl)-n-tetradecylamine, N-methyl-N-(n-butyl)-n-hexadecylamine, N-methyl-N-(n-butyl)-n-octadecylamine, N-methyl-N-(n-butyl)-eicosylamine, N-methyl-N-(n-butyl)-oleylamine;

N-methyl-N,N-di-(n-heptyl)-amine, N-methyl-N,N-di-(n-octyl)-amine, N-methyl-N,N-di-(2-ethylhexyl)-amine, N-methyl-N,N-di-(n-nonyl)-amine, N-methyl-N,N-di-(iso-nonyl)-amine, N-methyl-N,N-di-(n-decyl)-amine, N-methyl-N,N-di-(2-propylheptyl)-amine, N-methyl-N,N-di-(n-undecyl)-amine, N-methyl-N,N-di-(n-dodecyl)-amine, N-methyl-N,N-di-(n-tridecyl)-amine, N-methyl-N, N-di-(iso-tridecyl)-amine, N-methyl-N, N-di-(n-tetra-decyl)-amine;

N-ethyl-N,N-di-(n-heptyl)-amine, N-ethyl-N,N-di-(n-octyl)-amine, N-ethyl-N,N-di-(2-ethylhexyl)-amine, N-ethyl-N,N-di-(n-nonyl)-amine, N-ethyl-N,N-di-(iso-nonyl)-amine, N-ethyl-N,N-di-(n-decyl)-amine, N-ethyl-N,N-di-(2-propylheptyl)-amine, N-ethyl-N,N-di-(n-undecyl)-amine, N-ethyl-N,N-di-(n-dodecyl)-amine, N-ethyl-N,N-di-(n-tridecyl)-amine, N-ethyl-N,N-di-(iso-tridecyl)-amine, N-ethyl-N,N-di-(n-tetradecyl)-amine;

N-(n-butyl)-N,N-di-(n-heptyl)-amine, N-(n-butyl)-N,N-di-(n-octyl)-amine, N-(n-butyl)-N,N-di-(2-ethylhexyl)-amine, N-(n-butyl)-N,N-di-(n-nonyl)-amine, N-(n-butyl)-N,N-di-(iso-nonyl)-amine, N-(n-butyl)-N,N-di-(n-decyl)-amine, N-(n-butyl)-N,N-di-(2-propylheptyl)-amine, N-(n-butyl)-N,N-di-(n-undecyl)-amine, N-(n-butyl)-N,N-di-(n-dodecyl)-amine, N-(n-butyl)-N,N-di-(n-tridecyl)-amine, N-(n-butyl)-N,N-di-(iso-tridecyl)-amine;

N-methyl-N-(n-heptyl)-N-(n-dodecyl)-amine, N-methyl-N-(n-heptyl)-N-(n-octadecyl)-amine, N-methyl-N-(n-octyl)-N-(2-ethylhexyl)-amine, N-methyl-N-(2-ethylhexyl)-N-(n-dodecyl)-amine, N-methyl-N-(2-propylheptyl)-N-(n-undecyl)-amine, N-methyl-N-(n-decyl)-N-(n-dodecyl)-amine, N-methyl-N-(n-decyl)-N-(-tetradecyl)-amine, N-methyl-N-(n-decyl)-N-(n-hexadecyl)-amine, N-methyl-N-(n-decyl)-N-(n-octadecyl)-amine, N-methyl-N-(n-decyl)-N-oleylamine, N-methyl-N-(n-dodecyl)-N-(iso-tridecyl)-amine, N-methyl-N-(n-dodecyl)-N-(n-tetradecyl)-amine, N-methyl-N-(n-dodecyl)-N-(n-hexa-decyl)-amine, N-methyl-N-(n-dodecyl)-oleylamine;

Also suitable tertiary hydrocarbyl amines of formula $NR^4R^5R^6$ are monocyclic structures, wherein one of the short-chain hydrocarbyl residue forms with the nitrogen atom and with the other short-chain hydrocarbyl residue a five- or six-membered ring. Oxygen atoms and/or further nitrogen atoms may additionally be present in such five- or six-membered ring. In each case, such cyclic tertiary amines carry at the nitrogen atom or at one of the nitrogen atoms, respectively, the long-chain $C_7$- to $C_{20}$-hydrocarbyl residue. Examples for such monocyclic tertiary amines are N—($C_7$- to $C_{20}$-hydrocarbyl)-piperidines, N—($C_7$- to $C_{20}$-hydrocarbyl)-piperazines and N—($C_7$- to $C_{20}$-hydrocarbyl)-morpholines.

The inventive fuel composition may comprise further customary coadditives, as described below:

Corrosion inhibitors suitable as such coadditives are, for example, succinic esters, in particular with polyols, fatty acid derivatives, for example oleic esters, oligomerized fatty acids and substituted ethanolamines.

Demulsifiers suitable as further coadditives are, for example, the alkali metal and alkaline earth metal salts of alkyl-substituted phenol- and naphthalenesulfonates and the alkali metal and alkaline earth metal salts of fatty acid, and also alcohol alkoxylates, e.g. alcohol ethoxylates, phenol alkoxylates, e.g. tert-butylphenol ethoxylates or tert-pentylphenol ethoxylates, fatty acid, alkylphenols, condensation products of ethylene oxide and propylene oxide, e.g. ethylene oxide-propylene oxide block copolymers, polyethyleneimines and polysiloxanes.

Dehazers suitable as further coadditives are, for example, alkoxylated phenol-formaldehyde condensates.

Antifoams suitable as further coadditives are, for example, polyether-modified polysiloxanes.

Antioxidants suitable as further coadditives are, for example, substituted phenols, e.g. 2,6-di-tert-butylphenol and 2,6-di-tert-butyl-3-methylphenol, and also phenylenediamines, e.g. N,N'-di-sec-butyl-p-phenylenediamine.

Metal deactivators suitable as further coadditives are, for example, salicylic acid derivatives, e.g. N,N'-disalicylidene-1,2-propanediamine.

Suitable solvents, especially also for fuel additive packages, are, for example, nonpolar organic solvents, especially aromatic and aliphatic hydrocarbons, for example toluene, xylenes, "white spirit" and the technical solvent mixtures of the designations Shellsol® (manufacturer: Royal Dutch/Shell Group), Exxol® (manufacturer: ExxonMobil) and Solvent Naphtha. Also useful here, especially in a blend with the nonpolar organic solvents mentioned, are polar organic solvents, in particular alcohols such as tert-butanol, isoamyl alcohol, 2-ethylhexanol and 2-propylheptanol.

When the coadditives and/or solvents mentioned are used in addition in gasoline fuel, they are used in the amounts customary therefor.

In an especially preferred embodiment, as the at least one fuel additive (D) to be used together with the alkoxylated polytetrahydrofurane (I) mentioned which is different from the said alkoxylated polytetrahydrofuran and has detergent action is selected from (Da) polyisobutene monoamines or polyisobutene polyamines having $M_n$=300 to 5000, having predominantly vinylidene double bonds (normally at least 50 mol-% of vinylidene double bonds, especially at least 70 mol-% of vinylidene double bonds) and having been prepared by hydroformylation of the respective polyisobutene and subsequent reductive amination with ammonia, monoamines or polyamines. Such polyisobutene monoamines and polyisobutene polyamines are preferably applied in combination with at least one mineral or synthetic carrier oil, more preferably in combination with at least one polyether-based or polyetheramine-based carrier oil, most preferably in combination with at least one $C_6$-$C_{18}$-alcohol-started polyether having from about 5 to 35 $C_3$-$C_6$-alkylene oxide units, especially selected from propylene oxide, n-butylene oxide and isobutylene oxide units, as described above.

The present invention also provides an additive concentrate which comprises at least one alkoxylated polytetrahydrofurane of general formula (I), and at least one fuel additive which is different from the alkoxylated polytetrahydrofurane (I) and has detergent action. Otherwise, the inventive additive concentrate may comprise the further coadditives mentioned above. In case of additive concentrates for gasoline fuels, such additive concentrates are also called gasoline performance packages.

The alkoxylated polytetrahydrofurane (I) mentioned is present in the inventive additive concentrate preferably in an amount of 1 to 99% by weight, more preferably of 15 to 95% by weight and especially of 30 to 90% by weight, based in each case on the total weight of the concentrate. The at least one fuel additive which is different from the alkoxylated polytetrahydrofurane (I) mentioned and has detergent action is present in the inventive additive concentrate preferably in an amount of 1 to 99% by weight, more preferably of 5 to 85% by weight and especially of 10 to 70% by weight, based in each case on the total weight of the concentrate.

The alkoxylated polytetrahydrofurane (I) mentioned provides for quite a series of advantages and unexpected performance and handling improvements in view of the respective solutions proposed in the art. Effective fuel saving in the operation of a spark-ignited internal combustion engine is achieved. The respective fuel additive concentrates remain homogeneously stable over a prolonged period without any phase separation and/or precipitates. Miscibility with other fuel additives is improved and the tendency to form emulsions with water is suppressed. The high level of intake valve and combustion chamber cleanliness achieved by the modern fuel additives is not being worsened by the presence of the alkoxylated polytetrahydrofurane (I) mentioned in the fuel. Power loss in internal combustion engines is minimized and acceleration of internal combustion engines is improved. The presence of the alkoxylated poly-tetra-hydrofurane (I) mentioned in the fuel also provides for an improved lubricating performance of the lubricating oils in the internal combustion engine.

The examples which follow are intended to further illustrate the present invention without restricting it.

EXAMPLES

Example 1: Preparation of an Alkoxylated Polytetrahydrofurane from Polytetrahydrofurane 650 with 12 Equivalents of $C_{12}$-Epoxide and 20 Equivalents of Butylene Oxide (Block)

A steel reactor (1.5 l) was loaded with polytetrahydrofurane (MW 250) (0.2 mol, 130 g), and 3.4 g KOtBu was mixed and the reactor was purged with nitrogen. The reactor was heated under vacuum (10 mbar) and heated to 140° C. for 0.25 h. Then again nitrogen was loaded. At a pressure of 2 bar 50 g $C_{12}$-epoxide was brought in dropwise at 140° C. 390 g $C_{12}$-epoxide of total (441 g; 2.4 mol) was added during 5 h at 140° C. and under pressure of 6 bar. Then butylene oxide (288 g, 4.0 mol) was added within 4 h at 140° C. The reactor was stirred for 10 h at 140° C. and cooled to 80° C. The product was stripped by nitrogen. Then the product was discharged and mixed with Ambosol® (magnesium silicate, 30 g) and mixed on a rotary evaporator at 80° C. The purified product was obtained by filtration in a pressure strainer (Filtrations media: Seitz 900). Yield: 866 g, quantitative (theor.: 859 g) OHZ: 30.1 mg KOH/g.

Example 2: Preparation of a Gasoline Performance Package 400 mg/kg of the alkoxylated polytetrahydrofurane of Example 1 above were mixed with a gasoline performance package comprising the customary detergent additive Kerocom® PIBA (a polyisobutene monoamine made by BASF SE, based on a poly-isobutene with $M_n$=1000), a customary polyether-based carrier oil, kerosene as a diluent and a customary corrosion inhibitor in customary amounts.

Example 3: Fuel Economy Tests

A typical Eurosuper base fuel to EN 228 customary on the European market was additized with the gasoline performance package of Example 2 in the dosage rate specified there and used to determine fuel economy in a fleet test with three different automobiles according to U.S. Environmental Protection Agency Test Protocol, C.F.R. Title 40, Part 600, Subpart B. For each automobile, the fuel consumption was determined first with unadditized fuel and then with the same fuel which now, however, comprised the gasoline performance package of Example 2 in the dosage specified there. The following fuel savings were achieved:
  2004 Mazda 3, 2.0 L 14: 2.00%;
  Honda Civic, 1.8 L 14: 0.95%;
  2010 Chevy HRR, 2.2 L 14: 0.66%
On average, over all automobiles used, the result was an average fuel saving of 1.20%.

Example 4: Engine Cleanliness Tests

In order to demonstrate that the alkoxylated polytetrahydrofuranes (I) mentioned do not decrease engine cleanliness, the average IVD values and the TCD values were determined with gasoline performance package of Example 2 ("GPP 1") and, for comparison, with the same gasoline performance package without the alkoxylated polytetrahydrofurane of Example 1 ("GPP 2"), according to CEC F-20-98 with a Mercedes Benz M111 E engine using a customary RON 95 E10 gasoline fuel and a customary RL-223/5 engine oil. The following table shows the results of the determinations:

| Additive | average IVD [mg/valve] | TCD [mg] |
|---|---|---|
| None | 118 | 2852 |
| GPP 1 | 3 | 4582 |
| GPP 2 | 12 | 4433 |

Example 5: Storage Stability 48.0% by weight of GPP 2 above were mixed with 14.3% by weight of alkoxylated polytetrahydrofurane of Example 1 and 37.7% by weight of xylene at 20° C. and stored thereafter in a sealed glass bottle at −20° C. for 42 days. At the beginning of this storage period and then after each 7 days, the mixture was evaluated visually and checked for possible phase separation and precipitation. It is the aim that the mixture remains clear ("c"), homogeneous ("h") and liquid ("l") after storage and does not exhibit any phase separation ("ps") or precipitation ("pr"). The following table shows the results of the evaluations:

| | |
|---|---|
| after 7 days | c, h, l |
| after 14 days | c, h, l |
| after 21 days | c, h, l |
| after 28 days | c, h, l |
| after 35 days | c, h, l |
| after 42 days | c, h, l |
| Result: | pass |

The invention claimed is:

1. A method for reducing fuel consumption in operating an internal combustion engine with a fuel, the method comprising:
  introducing an alkoxylated polytetrahydrofurane of formula (I)

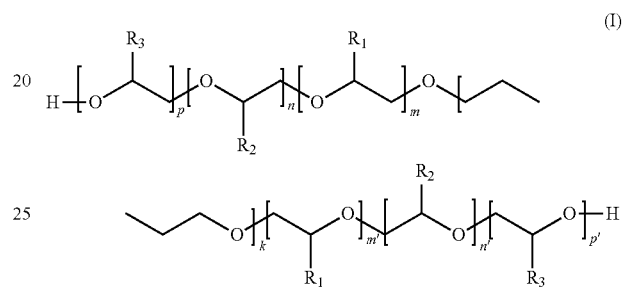

into the fuel as an additive,
  wherein
  m is an integer in the range of ≥1 to ≤50,
  m' is an integer in the range of ≥1 to ≤50,
  (m+m') is an integer in the range of ≥2 to ≤90,
  n is an integer in the range of ≥0 to ≤75,
  n' is an integer in the range of ≥0 to ≤75,
  p is an integer in the range of ≥0 to ≤75,
  p' is an integer in the range of ≥0 to ≤75,
  k is an integer in the range of ≥2 to ≤30,
  $R^1$ denotes an unsubstituted, linear or branched, alkyl radical having 6, 7, 8, 9, 10, 11, 12, 13, 14 15, 16, 17, 18, 19 20, 21 22, 23, 24, 25, 26, 27 or 28 carbon atoms,
  $R^2$ denotes —$CH_2$—$CH_3$, and
  $R^3$ denotes a hydrogen atom,
  whereby the concatenations denoted by k are distributed to form a block polymeric structure and the concatenations denoted by p, p', n, n', m and m' are distributed to form a block polymeric structure.

2. The method as described in claim 1, wherein the additive minimizes power loss in the internal combustion engine and improves acceleration of the internal combustion engine.

3. The method as described in claim 1, wherein the additive improves the lubricity of lubricant oils contained in the internal combustion engine for lubricating purposes by operating the internal combustion engine with the fuel containing an effective amount of at least one alkoxylated polytetrahydrofurane of formula (I).

4. The method according to claim 1, wherein k is an integer in the range of ≥3 to ≤25.

5. The method according to claim 1, wherein the alkoxylated polytetrahydrofurane has a weight average molecular weight Mw in the range of 500 to 20000 g/mol determined according to DIN 55672-1 (polystyrene calibration standard).

6. The method according to claim 1, wherein (m+m') is in the range of ≥3 to ≤65.

7. The method according to claim 1 wherein the ratio of (m+m') to k is in the range of 0.3:1 to 6:1.

8. The method according to claim 1, wherein m is an integer in the range of ≥1 to ≤25 and m' is an integer in the range of ≥1 to ≤25.

9. The method according to claim 1, wherein $R^1$ denotes an unsubstituted, linear alkyl radical having 6, 7, 8, 9, 10, 11, 12, 13, 14, 15, 16, 17 or 18 carbon atoms.

10. The method according to claim 1, wherein
m is an integer in the range of ≥1 to ≤30,
m' is an integer in the range of ≥1 to ≤30,
(m+m') is an integer in the range of ≥3 to ≤50,
n is an integer in the range of ≥3 to ≤45,
n' is an integer in the range of ≥3 to ≤45,
(n+n') is an integer in the range of ≥6 to ≤90,
p is an integer in the range of ≥0 to ≤75,
p' is an integer in the range of ≥0 to ≤75,
k is an integer in the range of ≥3 to ≤25,
$R^1$ denotes an unsubstituted, linear or branched, alkyl radical having 6, 7, 8, 9, 10, 11, 12, 13, 14, 15, 16, 17 or 18 carbon atoms,
$R^2$ denotes —CH$_2$CH$_3$, and
$R^3$ denotes a hydrogen atom.

11. The method according to claim 10, wherein the ratio of (m+m') to k is in the range of 0.3:1 to 6:1 and the ratio of (n+n') to k is in the range of 1.5:1 to 10:1.

12. The method according to claim 1, wherein
m is an integer in the range of ≥1 to ≤30,
m' is an integer in the range of ≥1 to ≤30,
(m+m') is an integer in the range of ≥3 to ≤50,
n is an integer in the range of ≥0 to ≤45,
n' is an integer in the range of ≥0 to ≤45,
p is an integer in the range of ≥3 to ≤45,
p' is an integer in the range of ≥3 to ≤45,
(p+p') is an integer in the range of ≥6 to ≤90,
k is an integer in the range of ≥3 to ≤25,
$R^1$ denotes an unsubstituted, linear or branched, alkyl radical having 6, 7, 8, 9, 10, 11, 12, 13, 14, 15, 16, 17 or 18 carbon atoms,
$R^2$ denotes —CH$_2$—CH$_3$, and
$R^3$ denotes a hydrogen atom.

13. The method according to claim 12, wherein the ratio of (m+m') to k is in the range of 0.3:1 to 6:1 and the ratio of (p+p') to k is in the range of 1.5:1 to 10:1.

14. A fuel composition comprising, in a major amount, a gasoline fuel and, in a minor amount, at least one alkoxylated polytetrahydrofurane of formula (I), and at least one fuel additive which is different from the alkoxylated polytetrahydrofurane (I) and has detergent action, $$\text{(I)}$$

wherein
m is an integer in the range of ≥1 to ≤50,
m' is an integer in the range of ≥1 to ≤50,
(m+m') is an integer in the range of ≥2 to ≤90,
n is an integer in the range of ≥0 to ≤75,
n' is an integer in the range of ≥0 to ≤75,
p is an integer in the range of ≥0 to ≤75,
p' is an integer in the range of ≥0 to ≤75,
k is an integer in the range of ≥2 to ≤30,
$R^1$ denotes an unsubstituted, linear or branched, alkyl radical having 6, 7, 8, 9, 10, 11, 12, 13, 14, 15, 16, 17, 18, 19, 20, 21, 22, 23, 24, 25, 26, 27 or 28 carbon atoms,
$R^2$ denotes —CH$_2$—CH$_3$, and
$R^3$ denotes a hydrogen atom,
whereby the concatenations denoted by k are distributed to form a block polymeric structure and the concatenations denoted by p, p', n, n', m and m' are distributed to form a block polymeric structure.

15. The fuel composition according to claim 14 comprising, as the fuel additive which is different from the alkoxylated polytetrahydrofuran (I) and has detergent action, at least one representative (D) selected from the group consisting of:
(Da) a mono- or polyamino group having up to 6 nitrogen atoms, at least one nitrogen atom having basic properties;
(Db) a nitro group, optionally in combination with at least one hydroxyl group;
(Dc) a hydroxyl group in combination with at least one mono- or polyamino group, at least one nitrogen atom having basic properties;
(Dd) a carboxyl group or an alkali metal or an alkaline earth metal salt thereof;
(De) a sulfonic acid group or an alkali metal or an alkaline earth metal salt thereof;
(Df) a polyoxy-C$_2$-C$_4$-alkylene moiety terminated by at least one hydroxyl group, at least one mono- or polyamino group, at least one nitrogen atom having basic properties, or by at least one carbamate group;
(Dg) a carboxylic ester group;
(Dh) a moiety derived from succinic anhydride and having at least one hydroxyl and/or amino and/or amido and/or imido group; and/or
(Di) a moiety obtained by Mannich reaction of at least one substituted phenol with at least one aldehyde and at least one mono- or polyamine.

16. The fuel composition according to claim 14, additionally comprising, as a further fuel additive in a minor amount, at least one carrier oil.

17. The fuel composition according to claim 14, additionally comprising, as a further fuel additive in a minor amount, at least one tertiary hydrocarbyl amine of formula NR$^4$R$^5$R$^6$ wherein R$^4$, R$^5$ and R$^6$ are the same or different C$_1$- to C$_{20}$-hydrocarbyl residues with the proviso that the overall number of carbon atoms in formula (I) does not exceed 30.

18. The fuel composition according to claim 15, comprising at least one representative (D) which is (Da), which is a polyisobutene monoamine or a polyisobutene polyamine having M$_n$=300 to 5000, having at least 50 mol-% of vinylidene double bonds and having been prepared by hydroformylation of the respective polyisobutene and subsequent reductive amination with ammonia, monoamines or polyamines, in combination with at least one mineral or synthetic carrier oil.

19. An additive concentrate, comprising at least one alkoxylated polytetrahydrofurane of formula (I), and at least one fuel additive which is different from the alkoxylated polytetrahydrofurane (I) and has detergent action,

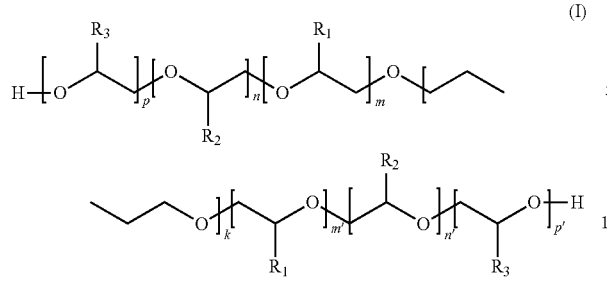

wherein
m is an integer in the range of ≥1 to ≤50,
m' is an integer in the range of ≥1 to ≤50,
(m+m') is an integer in the range of ≥2 to ≤90,
n is an integer in the range of ≥0 to ≤75,
n' is an integer in the range of ≥0 to ≤75,
p is an integer in the range of ≥0 to ≤75,
p' is an integer in the range of ≥0 to ≤75,
k is an integer in the range of ≥2 to ≤30, $R^1$ denotes an unsubstituted, linear or branched, alkyl radical having 6, 7, 8, 9, 10, 11, 12, 13, 14, 15, 16, 17, 18, 19, 20, 21, 22, 23, 24, 25 26, 27 or 28 carbon atoms,
$R^2$ denotes —$CH_2$—$CH_3$, and
$R^3$ denotes a hydrogen atom,
whereby the concatenations denoted by k are distributed to form a block polymeric structure and the concatenations denoted by p, p', n, n', m and m' are distributed to form a block polymeric structure.

20. The additive concentrate according to claim 19, comprising at least one representative (Da), which is a polyisobutene monoamine or polyisobutene polyamine having $M_n$=300 to 5000, having at least 50 mol-% of vinylidene double bonds and having been prepared by hydroformylation of the respective polyisobutene and subsequent reductive amination with ammonia, monoamines or polyamines, and further comprising at least one mineral or synthetic carrier oil.

* * * * *